United States Patent [19]

Kemper

[11] 4,152,945

[45] May 8, 1979

[54] POWER TRANSMITTING MECHANISM

[75] Inventor: Yves J. Kemper, Birmingham, Mich.

[73] Assignee: Vadetec Corporation, Troy, Mich.

[21] Appl. No.: 819,402

[22] Filed: Jul. 26, 1977

Related U.S. Application Data

[62] Division of Ser. No. 706,204, Jul. 19, 1976, abandoned.

[30] Foreign Application Priority Data

Apr. 21, 1976 [FR] France .................... 76 11753

[51] Int. Cl.² ............... F16H 15/16; F16H 23/00; F16H 1/28; F02B 75/26
[52] U.S. Cl. .................................. 74/191; 74/60; 74/800; 123/58 AA
[58] Field of Search .............. 74/191 LL, 199, 200, 74/60, 800, 190; 123/58 AA

[56] References Cited

U.S. PATENT DOCUMENTS 3,221,564  12/1965  Raymond ..................... 74/60

FOREIGN PATENT DOCUMENTS 2634244  2/1977  Fed. Rep. of Germany ............ 74/191

*Primary Examiner*—Leonard H. Gerin
*Attorney, Agent, or Firm*—Robert F. Ziems

[57] ABSTRACT

A power transmitting mechanism for converting the thrust of reciprocating pistons to a rotary output shaft at speeds independent of the frequency of piston reciprocation. Power developed by expanding gases in accordance with well-known thermal cycles, such as the Stirling cycle, is transmitted by pistons to a bed plate capable of swashing motion about a point on the axis of the output shaft. The shaft is provided with a pair of oppositely convergent or biconical friction surfaces engageable by annular tracks carried with the bed plate in orbit which may be characterized as nutational. Axial adjustment of the annular tracks toward and away from the point on the output shaft varies the output shaft speed independently of input speed or piston frequency.

11 Claims, 5 Drawing Figures

POWER TRANSMITTING MECHANISM

CROSS-REFERENCE TO RELATED APPLICATION

This is a division of U.S. application Ser. No. 706,204, filed July 19, 1976, now abandoned.

BACKGROUND OF THE INVENTION

This invention concerns mechanical devices for transferring mechanical power from components with reciprocating motion to components with rotary motion.

In U.S. Pat. No. 3,955,432, issued May 11, 1976, there is disclosed a transmission having a first element defining a pair of rolling surfaces of revolution about a first axis, a second element having a pair of rolling surfaces of revolution on a second axis intersecting the first axis and including a system for urging the rolling surfaces of the second element against those of the first element, which system is gyroscopic in origin. Specifically, inertial means associated with the second element are deployed to develop a gyroscopic couple which acts to retain the rolling surfaces of the second element against the rolling surfaces of the first element at two points of contact located one on each side of a plane perpendicular to the first axis at the point of intersection thereof with the second axis. The gyroscopic couple thus developed is a combined function of the moment of inertia of the second element with respect to the second axis, the angle at which the first and second axes intersect, the rotational velocities of the second element around the first axis. In this transmission, the gyroscopic couple operates to both rock the second element around the point of axes intersection and maintain both rolling surfaces of the second element against both such surfaces of the first element in rolling friction contact.

To vary the ratio of input and output speeds of the transmission disclosed in this patent, provision is made to modify the angle of inclination of the second axis with respect to the first axis. As a result, the ratio of the radii of circles described by the points of rolling surface contact between the first and second elements, respectively, will be modified. Such a transmission is particularly well suited for the transmission of large forces due to the development of normal contact pressure by the gyroscopic couple while avoiding excessive axial forces on the transmission gear shafts as well as radial forces on the bearing supporting the second element.

Also in a corresponding U.S. application for patent Ser. No. 706,291, filed July 19, 1976 and owned in common with the present invention, the basic principles underlying the transmission disclosed in the afore-mentioned U.S. patent are again used but in an arrangement having an increased range of speed ratio variation without the requirement for variation in the angle of intersection between the axes of the respective first and second elements. This characteristic of operation is achieved by providing on one of the elements a pair of oppositely convergent cone-like rolling surfaces in which the apical half-angle of surface convergence (or divergence) is approximately equal to the angle at which the axes of the two elements intersect one another. The other of the two elements is provided with ring-like tracks providing the rolling surfaces so that the speed ratio of the transmission may be variable with the ratio of the rolling surface radii on the ring-like tracks to the radii of the cone-like members at the two points of rolling contact between the two elements.

SUMMARY OF THE PRESENT INVENTION

In accordance with the present invention, the desirable characteristics of the variable speed friction or traction drive transmissions of these prior disclosures, particularly the latter, are advantageously deployed in a piston machine such as a reciprocating engine, to convert the power developed by synchronously reciprocating pistons to a rotary output shaft capable of operating at variable angular velocities independent of the frequency of piston reciprocation. The invention is particularly suitable for use with engines of the type which operate in accordance with the known Stirling cycle as well as those adaptable to other forms of reciprocating energy such as Otto and Diesel cycle engines and steam engines.

The transmission of piston thrust to the variable speed traction drive or transmission is effected preferably by a gimble supported bed plate capable of movement in a manner of a swashplate and operably connected to one of the two transmission elements in a manner to develop a nutational type movement in that element. Such movement is converted to a rotary output in a manner similar to the transmissions disclosed in the aforementioned said prior application.

A primary objective of the present invention, therefore, is the provision of an energy conversion machine such as an engine in which power developed in synchronously reciprocating piston is converted variable speed to a rotary power output in a manner such that output speed may be varied independently of the frequency of piston reciprocation. Other objects and further scope of applicability of the present invention will be apparent from the detailed description to follow taken in conjunction with the accompanying drawings.

DETAILED DESCRIPTION OF THE PREFERRED EMBODIMENTS

Figure 1:
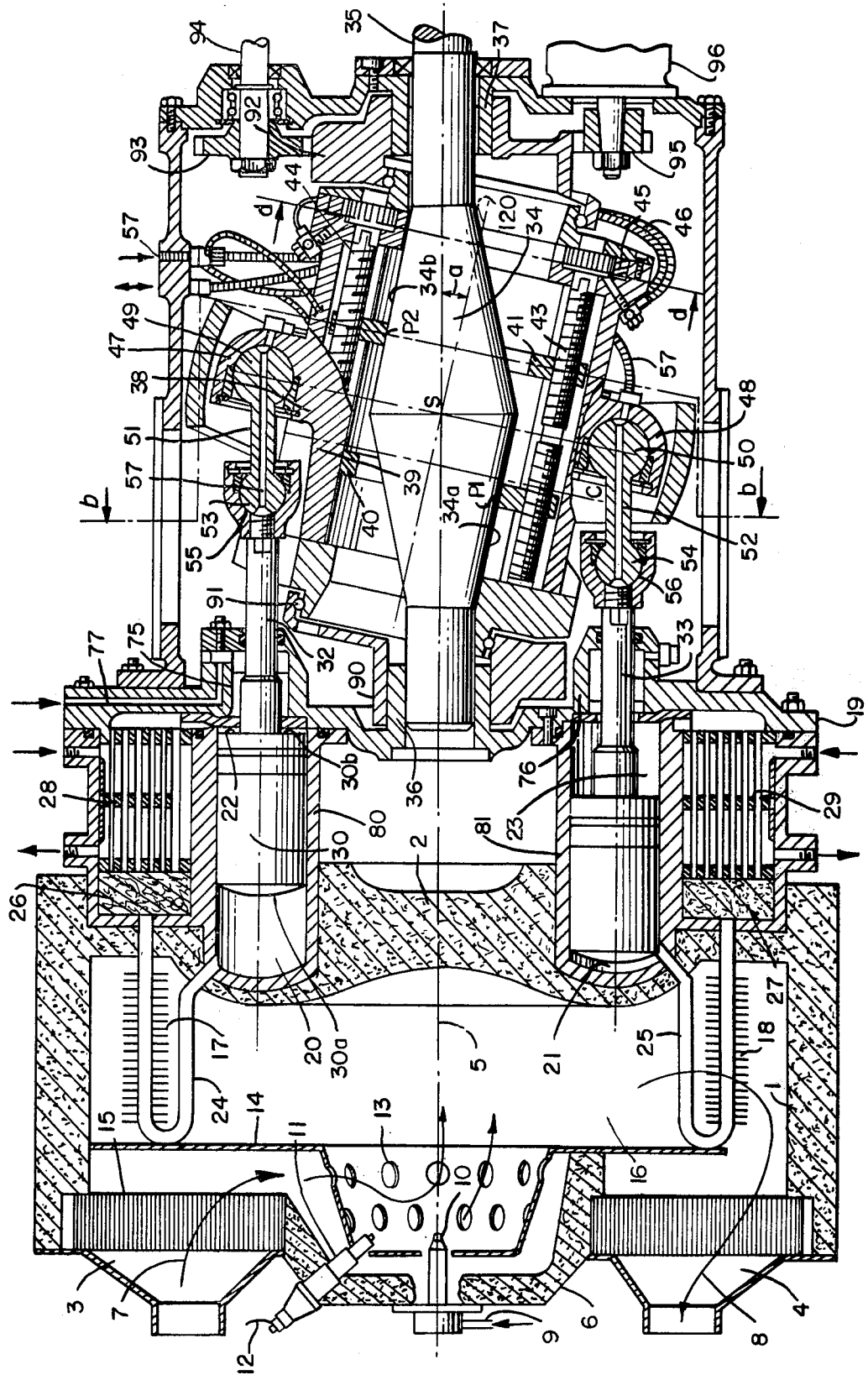
FIG. 1 is a longitudinal cross-section (line a—a of FIG. 3) illustrating an engine incorporating the present invention.

In FIG. 1 of the drawings, a heat engine is shown to include an enclosure 1 of high heat-resistant material, such as ceramic, for example. The approximately circular enclosure delimits a chamber 16, closed at one end by a ceramic wall 2 and communicating with the exterior by two apertures 3 and 4 in a well 6 which closes the other end of the chamber. The center of the enclosure is in longitudinal axis of the heat engine.

The apertures 3 and 4 are designed so as to permit the entry of air needed for combustion of fuel and for evacuation of the exhaust gases in the direction indicated by the arrows 7 and 8. The fuel is supplied by tubing 9 in the longitudinal axis of the engine and injected into the chamber through the port 10. A sparkplug 11 connected to an electric source (not shown) by the wire 12 initiates combustion. Air enters the chamber by a number of ports 13 in well 14 so as to intermix air and fuel homogenously.

In order to recover a part of the heat in the exhaust gases, a rotating heat exchanger 15 is provided so that cold air is heated in passing through the exchanger 15 while the exhaust gases impart their heat to exchanger 15. Within chamber 16 are four finned reheaters of which two, 17 and 18, are visible in FIG. 1. A good heat-conducting gas with low viscosity such as hydrogen or helium circulates within the reheaters. Although the connection of the reheaters to the chambers of the heat engine will be described below, they function to facilitate the transfer of heat from the fluid in them to the combustion gases.

The heat engine has a system of enclosures mounted on the body 19 in a circle around longitudinal axis 5 of the engine. Specifically, there are four variable-volume enclosures at high mean temperature (only 20 and 21 are shown in FIG. 1) and four variable-volume enclosures at lower mean temperature (only 22 and 23 are shown in FIG. 1).

The chambers at high mean temperature are housed in the ceramic wall 2 terminating the combustion chamber 16. Tubing 24 and 25 connect chambers at high mean temperature 20 and 21 to chambers at low mean temperature 22 and 23 which are shifted by 90° around engine axis 5 in relation to the hot chamber. The tubing also connects the reheaters 17 and 18, regenerators 26 and 27 and radiators 28 and 29.

The regenerators are of ceramic material and intended to withdraw a part of the heat energy of an active fluid when it is hot and restitute it after cooling. The radiators 28 and 29 have a flow of water and cool the hot fluid which flows through them.

The active fluid (hydrogen or helium) circulates alternately from the hot chamber to the cool chamber and traverses, first in one and then the other direction. The reheater, regenerator and radiator conform with a Stirling cycle.

The enclosures are delimited by cylindrical walls 80 and 81 in which the pistons move back and forth. The latter are mounted in a circle around the longitudinal engine axis. The hot variable-volume space 20 is closed by the face 30a of piston 30; the cool variable-volume 30b of the same piston by the other face 30b. The piston cylinders are mounted integral with the body 19 and the ceramic wall 2 of the combustion chamber 16. They are distributed uniformly offset by 90° around axis 5.

The engine thus shown operates in accordance with the well-known Stirling cycle which need not be described further herein. It will be recalled that it has four phases (compression, heating, expansion, cooling) and that the pistons travel parallel to axis 5. It will be recalled also that the alternate motion of the pistons is out-of-phase by an angle of about 90°.

The alternate motion of the pistons is transmitted by a system of connecting rods 32 and 33 to a transmission mechanism described further below. The connecting rods 32, 33 are joined to a system of deformable skirts 75, 76 to the walls of the low temperature space to prevent leakage. In order to balance the pressure within the chamber, a counterpressure is provided downstream of the skirt by a pressurized fluid injected through the channel 77.

The mechanism shown on the right side of FIG. 1 has a rotating component 34 of biconical form and rotates integrally with the take-off or power shaft 35. It is supported by two bearings 36, 37 centered on the axis 5 so that the component 34 has two conical rolling tracks 34a, 34b, arranged symmetrically on either side of the point S of axis 5. These revolve around this axis and their transverse decreases progressively starting from the perpendicular plane of the point S of axis 5.

The mechanism also has a mobile bed plate 38 which is prolonged by a nearly cylindrical body 39 in which are mounted two rolling tracks 40, 41 movable axially. The axis 120 of the cylindrical body passes through the point S of axis 5 and is inclined from the latter by an angle a. The angle a is nearly equal to the half-angle at the apex of the conical rolling tracks. The rolling tracks 40, 41 revolve around axis 120 and are movable axially in relation to each other along that axis. The rolling tracks 40, 41 are formed on two annular rings and permanently disposed symmetrically in relation to the perpendicular plane of S to axis 120 of the cylindrical body. They are operated by two threaded rods 43, 44 and each has a right-hand nut and a left-hand nut. The nuts are activated by a double hydraulic device 45 mounted at the end of the cylindrical body 39. The hydraulic fluid supply tubes of the device are shown at 46. The rolling tracks 40, 41 are kept in contact with the conical tracks 34a, 34b of the rotating component at the two points P1 and P2 by mechanisms to be described below.

Figure 2:
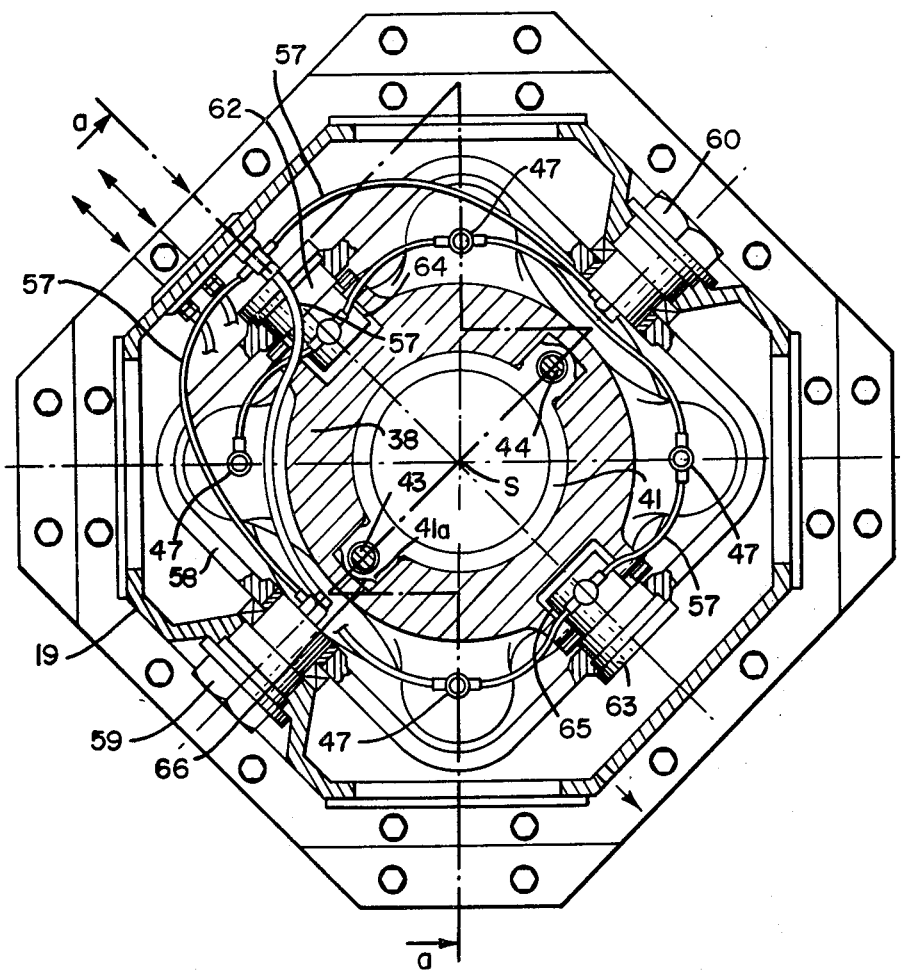
FIG. 2 is a transverse cross-section on line b—b of FIG. 1.

The bed plate 38 is supported by the body by a system of cardans shown in FIG. 2. The cardans support the bed plate on the body so that the plate can veer or swash around the point S. The axis 120 therefore describes a cone of apex S and of half-angle a around axis 5 and the rotating component is centered at the point S.

At the periphery of the bed plate are provided four bosses 47, 48 shown in FIG. 1. They are designed to receive ball-and-socket joints 49–50 whose centers lie in the plane perpendicular to the axis 120 at S, and are integral with links 51, 52. These links are also integral with the other end of ball-and-socket joints 53, 54 and these joints themselves are lodged in the semicircular recesses 55, 56 at the ends of the connecting rods 32, 33. Lubricating circuits 57 keep the bearings of the rotating component oiled, together with the ball-and-socket joints and the cardan articulations.

The linkages described between the pistons and the bed plate induce the latter in a swashing movement with angle a and speed $\dot{a}$ around the point S.

The mechanical system for forcing the rolling tracks 40, 41 of the bed plate against the rolling tracks 34a, 34b of the rotating element is of gyroscopic origin and described in the aforementioned issued patent. A complete description of the system is believed unnecessary herein except to note that the whole of the forces of elementary inertia originating in the mass of the bed plate and the cylindrical body prolonging it, reduces itself, due to the fact that the center of gravity of the bed plate lies on the point S, to a couple whose intensity is a function of:

(a) the principal moments of inertia of the bed plate and of the cylindrical body in relation to the axis 120 and in relation to an axis passing through S perpendicular to this axis;
(b) of the angle a of inclination of the axis 120 in relation to longitudinal axis 5;
(c) of the speed $\dot{a}$ of axis 120 in relation to axis 5;
(d) of the speed $\dot{\beta}^*$ of the bed plate and of the body around the axis 120 (the speed $\dot{\beta}^*$ having been measured in a frame of reference rotating at the speed $\dot{a}$ with axis 120); the speed $\dot{\beta}^*$ of the bed plate and body around axis 120 is zero in an absolute frame of reference linked to the body; consequently, the absolute value $\overset{\circ}{\beta}*$ is equal to the speed $\overset{\circ}{\alpha}$ of axis 120 around axis 5.

This couple causes the tilt of bed plate and cylindrical body so as to force the tracks 40, 41 in contact at P1 and P2, with the rolling tracks of the rotating component. The pressure of contact at P1 and P2 produced by the gyroscopic couple is adequate in normal operation to prevent slippage of tracks 40 and 41 on the tracks 34a and 34b.

It will be noted that the own inertial forces of the alternate motion of the pistons are added to those of the gyroscopic couple. These inertial forces reach their maximum at the end of their stroke and appreciably contribute to force the tracks of the rotating component.

The bed plate entrained into a swashing motion around the point S by the pistons entrains in its turn, by the intermediary of the tracks in rolling friction contact, the rotation of the rotating component and, consequently, the rotation of take-off shaft 35.

In the preceding U.S. Pat. No. 3,955,432, there was described the kinematic relation linking the speed of rotation $\overset{\circ}{\omega}$ of the rotating component to the speed $\overset{\circ}{\alpha}$ of the axis 120 around axis 5. This relation is a function of the ratio of the gyratory radii of the points P1 and P2 in relation to axis 5 and in relation to axis 120. A modification of this ratio involves a modification of the ratio of speeds $\overset{\circ}{\alpha}$ and $\overset{\circ}{\omega}$ of the bed plate and of the rotating component. Since the speed $\overset{\circ}{\alpha}$ of the bed plate itself is a function of the frequency of the alternate motion of the pistons, it is possible to vary the speed $\overset{\circ}{\omega}$ of the take-off shaft without modifying the frequency of piston action by changing the valve of the ratio of the gyratory radii. We have previously described the mechanism permitting axial displacement of tracks 40, 41. Taking into account the angular equality between the half-angle at the summit of the rolling tracks 34a and 34b and the angle of inclination a of the axis 120 from axis 5, it will be seen that the axial displacement of tracks 40 and 41 does not produce any changes in the angle of inclination a or any change of the gyratory radius of the point of contact around axis 120. On the other hand, this axial displacement modifies the value of the gyratory radius of the contact points P1 and P2 in relation to axis 5. Due to this fact, the mechanism of axial displacement of the pistons allows change in the speed $\overset{\circ}{\omega}$ of the take-off shaft in relation to the frequency of piston action.

The ends of the cylindrical body 39 of the mobile end plate are linked for rotation, by ball-and-socket joints like 91, with two auxiliary components 90, 92. The latter are themselves mobile in rotation in relation to the body around axis 5. They rotate around this axis at the same speed $\overset{\circ}{\alpha}$ as axis 120. The masses of the two components 90, 92 are so distributed as to balance out the rotating couple of reaction on the body which is caused by the mechanical system forcing the tracks of the bed plate against the tracks of the rotating component. In addition, one of the auxiliary components 92 has a toothed rim meshing with both a crown wheel 93 of take-off shaft 94 and with crown wheel 95 activated by a starting mechanism 96. The latter is provided to initiate the veering motion of the bed plate during the starting of the transmission and the heat engine. The take-off shaft 94 is used to activate the mechanisms of the heat engine which must be set in motion at a speed proportional or equal to the speed $\overset{\circ}{\alpha}$ of axis 120 around axis 5.

In FIG. 2 of the drawings, is a transverse cross-section along b—b of FIG. 1, certain components will be recognized from FIG. 1. The system of cardans supporting the veering or swashing bed plate is shown clearly to include a square cage 58 which turns freely on pivots 59 and 60 integral with the body and their axis passes through the point S. This cage itself has two pivots 62, 63 whose axes also pass through the point S and move freely in the two bosses 64, 65 of the bed plate 38.

A network of lubricating circuits is also shown in FIG. 2 in which oil is passed to the bearings of the pivoting parts, specifically the four lodgings 47 seen from the back, in which are articulated the ball-and-socket joints of the connecting-rod head and the four pivots 59, 60, 62, 63 for articulation of cage 58.

Also in this figure, the ends of the threaded rods 43, 44 which activate the rolling tracks like 41 along the longitudinal direction to axis 120 are shown. It will be noted that the rolling tracks like 41 have shoulders such as 41a sliding within grooves such as 66 in the cylindrical body integral with the bed plate. Due to the grooves and shoulders, the rolling tracks mobile axially are integral in rotation with the veering motion of the bed plate.

Figure 3:
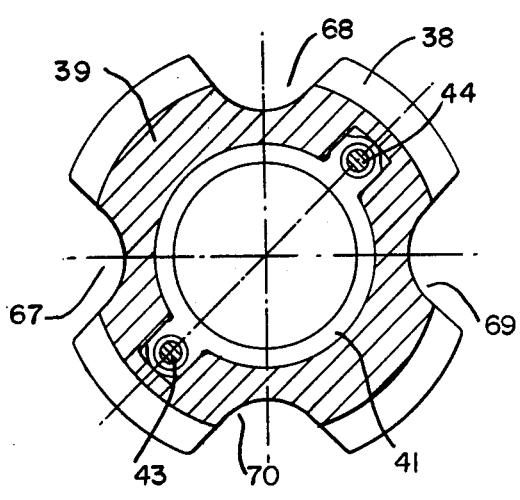
FIG. 3 is a transverse section on line c—c of FIG. 1.

FIG. 3 represents a transverse cross section along c—c of the bed plate in FIG. 1 and specifically the cylindrical body prolonging the bed plate. The threaded rods 43, 44 are shown for activating the annular ring on which are formed the tracks like 41. It shows also the four cutouts 67, 68, 69, 70 which allow passage of articulated links along cylindrical body 39.

Figure 4:
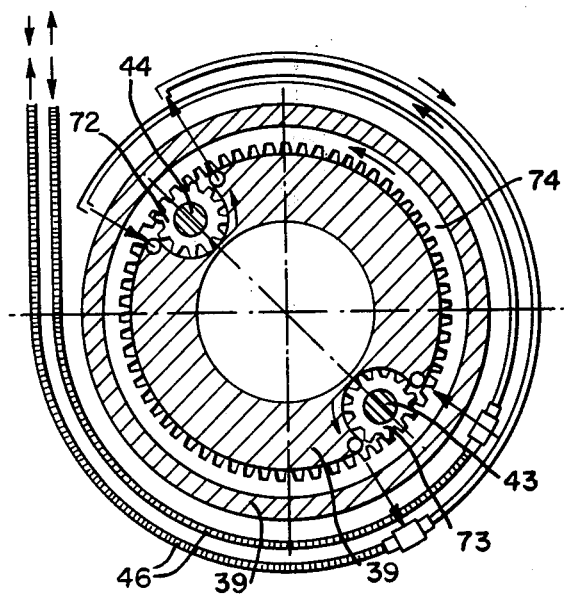
FIG. 4 is a transverse section along line d—d of FIG. 1.
Figure 5:
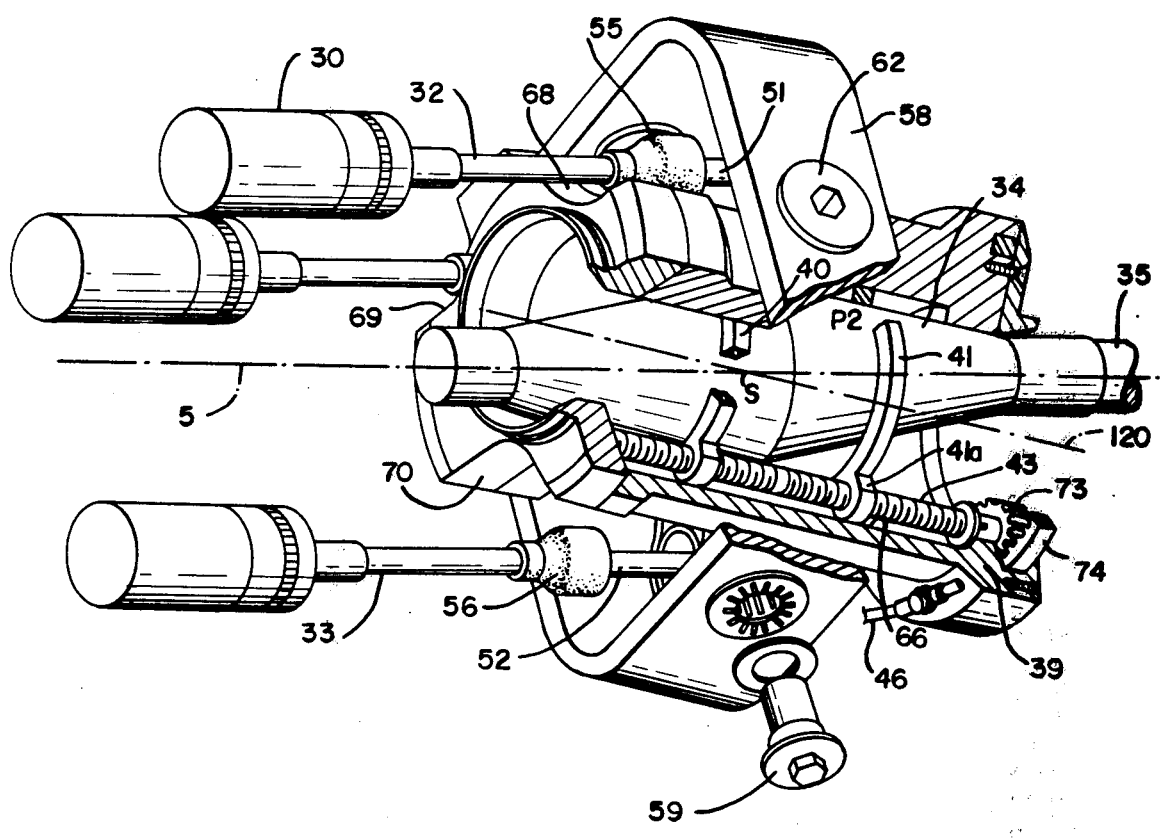
FIG. 5 is a perspective view, partially cut away to illustrate the principal components of the invention.

FIG. 4 represents a transverse cross section along d—d of the cylindrical body of the bed plate on which the hydraulic device is mounted. The threaded rods 43, 44 are caused to rotate by the gears 72, 73 lodged in recesses of the cylindrical body. These gears mesh with crown wheel 74 rotating freely in a groove of the cylindrical body whose axis is axis 120 of the cylindrical body.

In a known manner, the hydraulic fluid activates the displacement of the crown wheel thus rotating the threaded rods back and forth and consequently inducing the axial displacement of the rolling tracks 40, 41.

This invention has been illustrated by a single example of design of a thermal cycle and of a mechanism of transmission by friction. However, it is evident that, conforming with the invention, different thermal cycles may be employed.

The invention now having been explained and its advantages set forth by a detailed example, the petitioner for a patent thereon reserves his exclusive rights for the entire duration of the patent limited only to the terms of the following claims.

I claim:

1. A mechanical power transmitting apparatus having a frame, a rotary output shaft supported by the frame on a first axis, a plurality of reciprocable pistons located in the frame symmetrically about the first axis, and means to transmit power from the pistons to the output shaft characterized by: a mobile bed plate supported by the frame for swashing movement about a point on the first axis, a cylindrical extension connected to said bed plate and having an axis also intersecting said point, a pair of oppositely convergent cone-like rolling surfaces on the first axis, connected for rotation with the output shaft and symmetrically located with respect to said point, and closed circular rolling surfaces carried by said cylindrical extension for engagement with said cone-like surfaces at two contact points movable toward and away from said point on the first axis in equal distances therefrom.

2. The apparatus recited by claim 1 characterized in that said plate is supported from said frame by a system of cardans.

3. The apparatus as recited in claim 1 characterized in that said bed plate is integral with said extension.

4. The apparatus as recited in claim 1 characterized in that said closed circular rolling surfaces are formed on annular tracks movable axially in said cylindrical extension.

5. The apparatus as recited in claim 4 characterized in that the rolling surfaces on the first axis are oppositely convergent, truly conical surfaces.

6. The apparatus as recited in claim 5 characterized in that said rolling surfaces are integrally formed on said output shaft.

7. The apparatus recited in claim 1 characterized in that the cylindrical extension is linked for rotation at opposite ends with components which are rotatable on the first axis.

8. The apparatus as recited in claim 7 characterized in that the auxiliary rotatable means are drivably interconnected with said components for direct rotation therewith.

9. The apparatus as recited in claim 1 characterized in that the center of gravity of said bed plate coincides with said point on the first axis.

10. The apparatus as recited in claim 1 characterized in that the pistons are movable in chambers supported by said frame and on axes parallel to said first axis, said piston axes being located on a circle concentric with said first axis.

11. The apparatus as recited in claim 10 characterized in that said pistons are powered by a Stirling thermal cycle and operable in synchronized phase relation with swashing movement of said bed plate.

* * * * *